March 21, 1950 W. W. KEMP ET AL 2,501,280
PACKAGE DEHUMIDIFIER

Filed June 22, 1946 7 Sheets-Sheet 1

Inventors
W. W. Kemp and
H. M. Hanson.
By Thomas W. Y. Clark
Attorney

Inventors
W. W. Kemp and
H. M. Hanson
By Thomas W. J. Clark
Attorney

March 21, 1950  W. W. KEMP ET AL  2,501,280
PACKAGE DEHUMIDIFIER

Filed June 22, 1946  7 Sheets-Sheet 3

Inventors
W. W. Kemp and
H. M. Hanson.
By Thomas W. J. Clark
Attorney

March 21, 1950     W. W. KEMP ET AL     2,501,280
PACKAGE DEHUMIDIFIER

Filed June 22, 1946     7 Sheets-Sheet 5

Inventors
W. W. Kemp and
H. M. Hanson.
By Thomas W. J. Clark
Attorney

Inventors
W. W. Kemp and
H. M. Hanson.
By Thomas W. J. Clark
Attorney

March 21, 1950   W. W. KEMP ET AL   2,501,280
PACKAGE DEHUMIDIFIER

Filed June 22, 1946   7 Sheets-Sheet 7

TIMER CYCLE.

CONTROL CIRCUIT.

Inventors
W. W. Kemp and
H. M. Hanson
By Thomas W. J. Clark
Attorney

Patented Mar. 21, 1950

2,501,280

UNITED STATES PATENT OFFICE 2,501,280

PACKAGE DEHUMIDIFIER

William Wallace Kemp and Hartwig Millard Hanson, Baltimore, Md., assignors to The C. M. Kemp Manufacturing Company, Baltimore, Md., a corporation of Maryland Application June 22, 1946, Serial No. 678,694

8 Claims. (Cl. 183—4.5)

This invention relates to a package dehumidifier.

It embodies in one container weighing in the neighborhood of one hundred pounds, a substantially complete dehumidifying equipment which may be moved from place to place in a building or ship or may be placed under a tarpaulin over machinery so that the space may have the moisture content reduced to prevent rust, mildew, mold and rot of such equipment and its parts in such spaces.

The dehumidifier is entirely automatic in operation, after once being installed and started it will respond automatically to the demands of the humidity control system. This control may call for continuous operation during an initial period and thereafter for intermittent use after the space has been brought to the required humidity.

The dehumidifier is equipped with four air connections. If it is placed in the space to be dehumidified then it will be desirable to have short connections outside of the space being dehumidified for the reactivation air inlet and outlet. If on the other hand, the dehumidifier is placed outside the space being dehumidified, then hose connections are made to the dehumidifying air inlet and outlet to that space, thus the range of utility and adaptability of the package dehumidifier is practically universal where a relatively small equipment is adequate for the space the humidity of which is to be substantially reduced.

To accomplish the above purposes the dehumidifier consists essentially of a desiccant bed, heating element, circulating fan, valves and electrical control equipment. Drying is accomplished by passing moist air through the desiccant bed to remove the water from the air. After the desiccant bed has taken up water from the air approximately to its capacity it is reactivated by means of the heating element and passing warm air through the bed for a reactivation cycle. The dehumidifying cycle is substantially longer than the reactivation cycle and the two cycles are controlled by a timer which automatically throws the valves to the required air connections and turns the heating element on and off. For the complete protection of both the desiccant bed and the heating element a thermostatic control or overlimit thermostat is placed near the heating element to remove it from the circuit when excessive temperature is reached and to restore it to the circuit automatically when the normal temperature for the operation of the element has been reached.

Another object of the package dehumidifier is to place the valves which must operate with precision on one panel which may be readily removed for proper adjustment and replacement of parts. Another object is to similarly place the electrical control connections on a single panel which may be removed for ready adjustment and servicing. Other objects are to place both the desiccant bed and the air filter in readily accessible positions and to position the fan in an accessible position so that all these parts may be readily serviced and so that the desiccant bed and air filter may be replaced by relatively unskilled mechanics. Another object of the invention is to make a package dehumidifier of such compactness that it may be readily moved around and of such efficiency of complete exposure of the desiccant bed as to gain the highest efficiency from a given quantity of desiccant.

Other objects and advantages of the invention will be apparent from the following description and the accompanying drawings forming a part hereof and in which:

Figure 7 is a plan view with the top removed and with the top screen partly broken away to show the desiccant bed and heater.

In the drawings similar numerals refer to similar parts throughout the several views.

Figure 1:
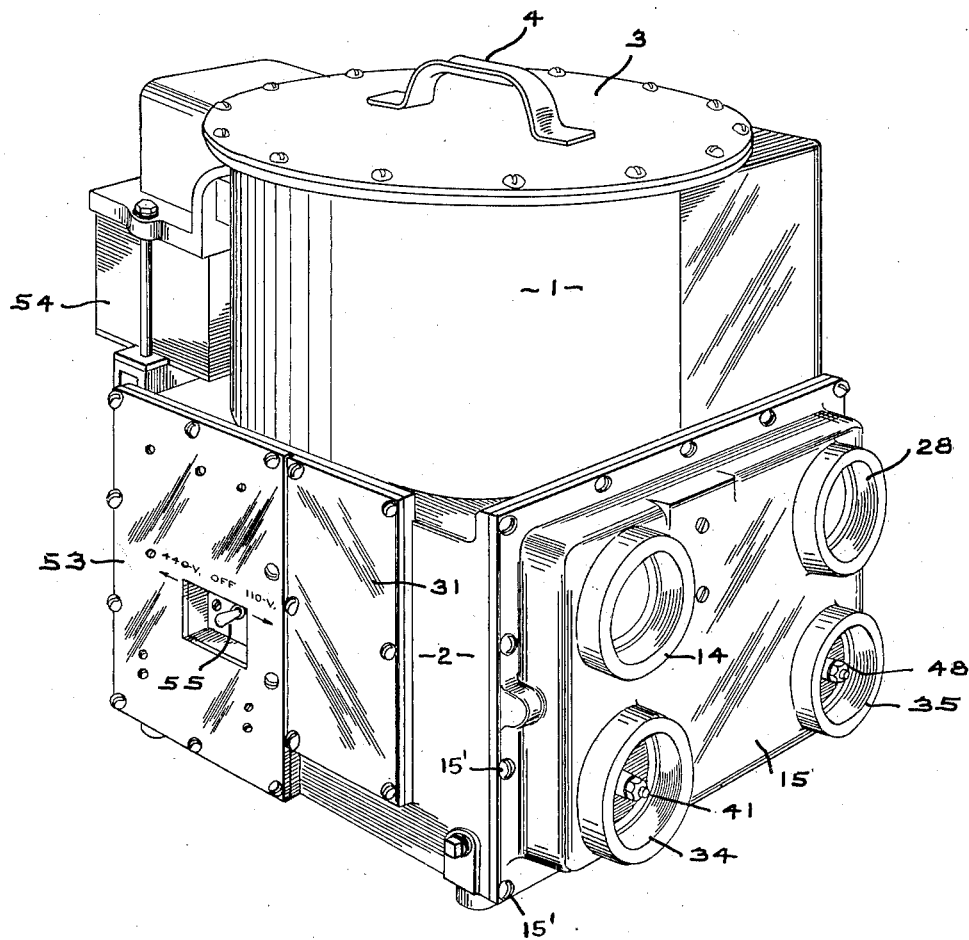
Figure 1 is a side perspective view of the package dehumidifier of this invention.
Figure 1:
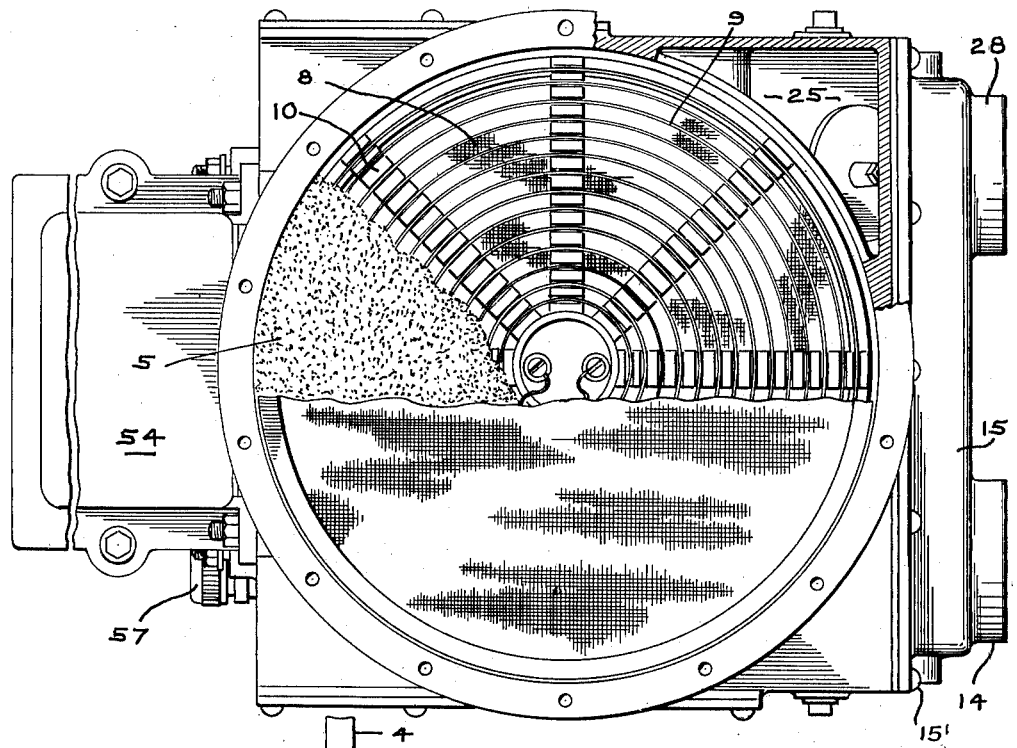
Figure 5:
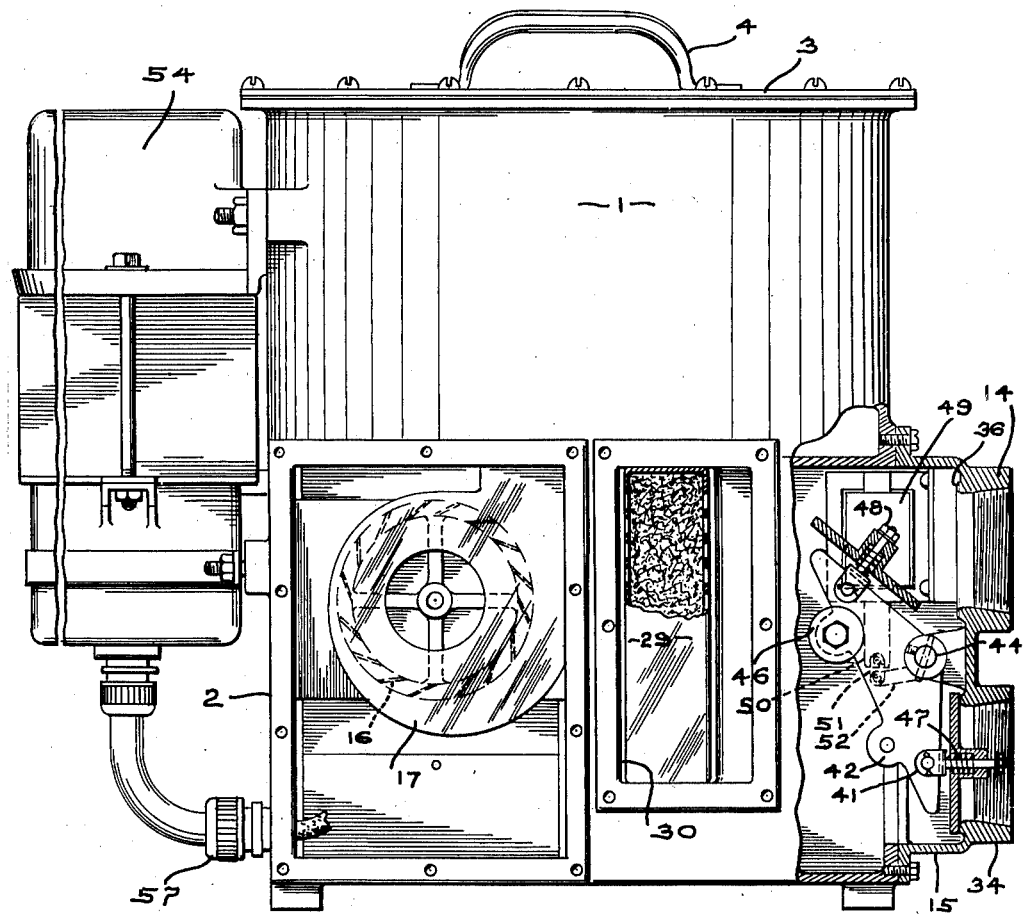
Figure 5 is a side elevation partially broken away showing the valve operating structure and with the electrical equipment panel and air filter panel removed.

The package dehumidifier has a casing or container the top section of which 1 is substantially round and the bottom section of which 2 is substantially square. These two portions are preferably made in one casting. The top section 1 has a cover 3 held on by screws which may be removed. The whole dehumidifier may be carried from place to place by means of the handle 4 on the cover 3. See Figures 1 and 5.

Figure 4:
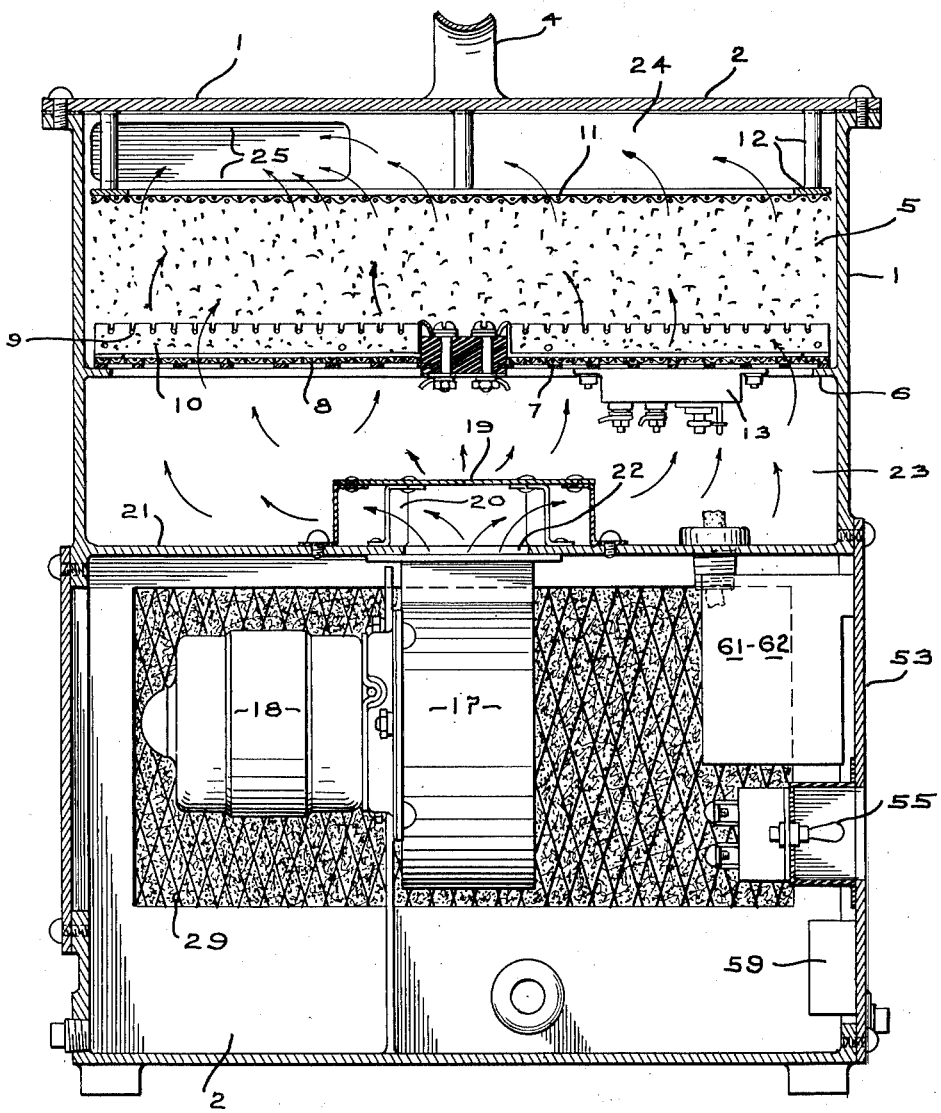
Figure 4 is a vertical sectional view through the dehumidifier.

Within the cylindrical portion 1 is the desiccant bed 5 consisting of granules of adsorbent material. The cylindrical portion 1 has near its center an integral ring 6 supporting expanded metal grating 7 which in turn supports screen 8 above which is placed heating element 9 on insulating support 10 and the desiccant may pass or fall through the heating element to the screen 8. An upper screen 11, held by an annular support 12 attached to the cover 3, holds the desiccant in place from above. See Figure 4.

Attached to the cylindrical portion 1 of the container is the automatic overlimit thermostat 13 which operates to cut off the current to the heater when its temperature becomes too high and it operates automatically to restore the current to the heater when the temperature of the heater has fallen to the normal temperature for the heating. This thermostat thus protects not only the heater from overheating but also protects the desiccant bed from too much heat. See Fig. 4.

Figure 2:
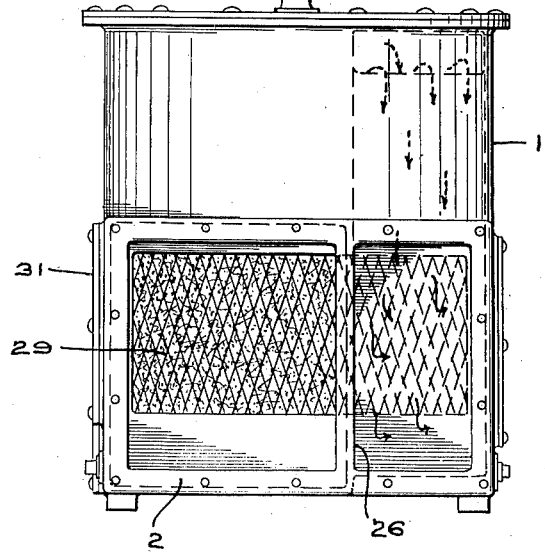
Figure 2 is a side elevation with the valve panel removed.
Figure 8:
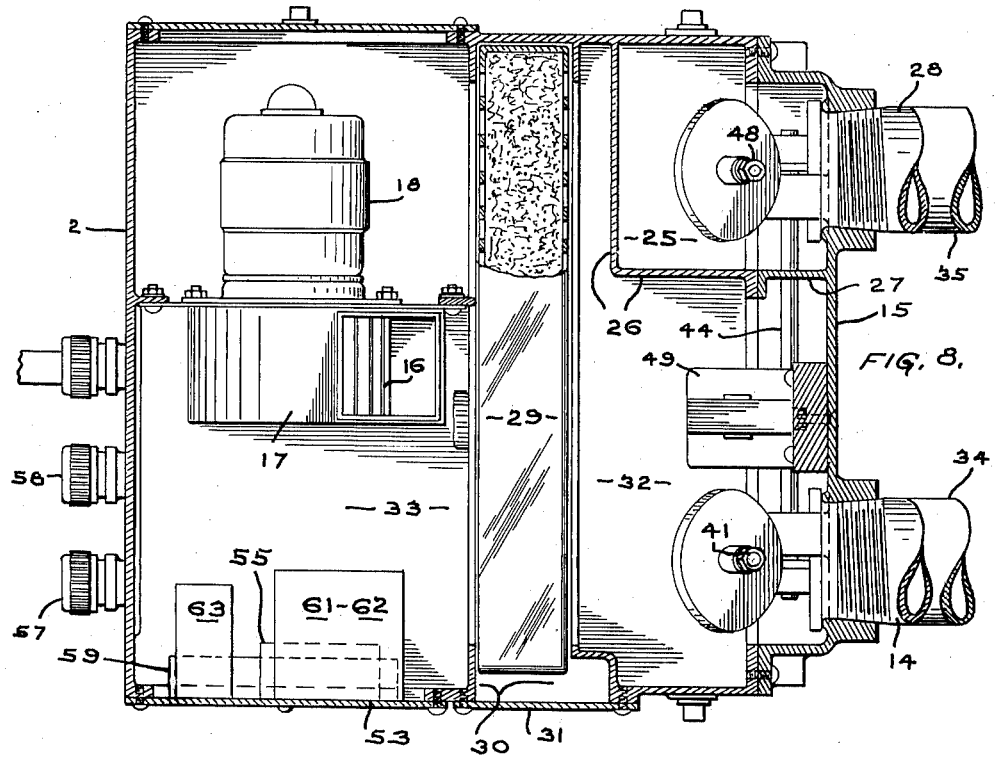
Figure 8 is a horizontal sectional view below the desiccant bed chamber.

Air is passed to this desiccant bed 5 after its entrance through humid air inlet 14 in air connection panel 15 attached by screws 16 to one side of the square portion 2 of the package dehumidified. Air passing in at this inlet 14 is drawn by fan 15 in casing 17, the fan being driven by motor 18. The air is discharged from the casing 17 against baffle 19 held by a spider 20 on plate 21 having an opening 22 centrally thereof and which plate divides the package dehumidifier into substantially separate compartments, the upper of which is the desiccant bed with its chambers below and above 23 and 24, respectively, to allow for the spreading out or expansion of the air over the whole lower surface of that bed and then to allow for the flowing of the air from the bed to the passage 25, the outer walls of which form a corner on the cylinder portion 1 of the package dehumidifier, and this passage 25 passes downwardly to openings in the air connection panel 15 for the discharge of air therethrough. See Figures 1, 4 and 8. The passage 25 has partitions 26 within the lower portion 2 of the container and the panel 15 has an inwardly extending rib 27 to join one of the partitions 26 to make a complete closed passage 25 to the outlets in the panel 15. Air in the drying cycle passes from the passage 25 through the panel 15 through dry air outlet 28. See Figures 2 and 8.

An air filter 29 is placed in a compartment 30 provided therefor in the square section 2 of the container. This air filter may be put in place and removed by the removal of panel 31 held by screws on the side of the square section of the container. This air filter extends substantially all the way across the square section 2 of the container and substantially for the height of that section to give as much surface with chambers 32 and 33 in front of it and in back of it respectively for the spreading or expansion of air before it and for its exit from it as possible, before the air is drawn into the fan casing 17 by the fan 15. See Figures 2 and 8.

When the desiccant bed 5 has adsorbed a reasonable quantity of moisture from the air the heater 9 is turned on and air is drawn through reactivation air inlet 34 from which it passes by being drawn by the fan under the heating element 9 and through the desiccant bed 5, the heating element heating the incoming air and driving the moisture from the desiccant in the desiccant bed through the passage 25 and out through the reactivation air outlet 35.

Figure 3:
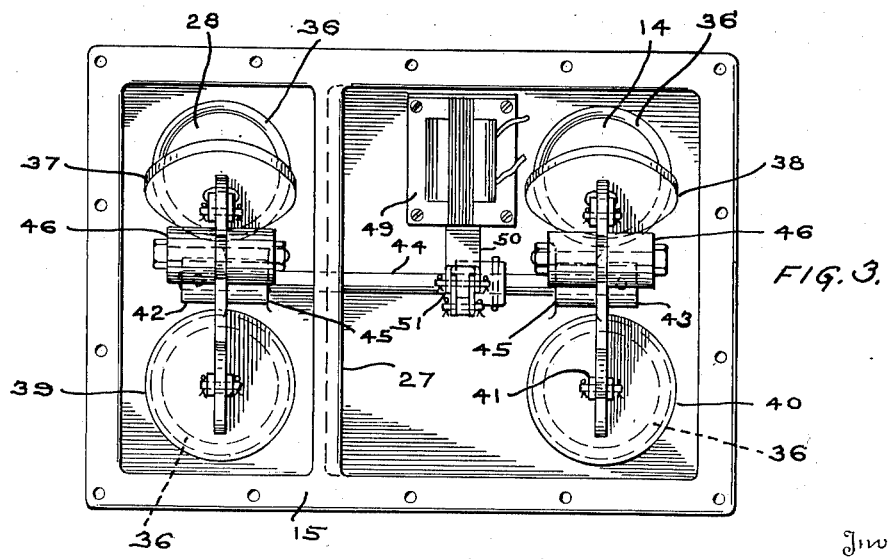
Figure 3 is a rear elevational view of the removed valve panel.

These respective inlets and outlets have valve seats 36. Valves 37 and 38 may be used to close and open the outlet and inlet 28 and 14. Valves 39 and 40 are used to close and open the reactivation air outlet and inlet respectively. These valves float freely on clevises 41 mounted on bell cranks 42 and 43 fast to rod 44 pivoted in brackets 45 and passing through an opening in rib 27, all on panel 15. The bell cranks 42 and 43 each have a weight 46 near their top at their back to pull them open when no other force is applied. Each of the valves has a countersunk opening at its rear center through which the clevise 41 passes and a spring 47 bears upon the inner constricted surface of this opening to push the valve firmly to its seat, the clevise has a nut 48 in its end to hold the valve upon its withdrawal. The spring and clevise allow for the free floating of the valve on the bell crank and for its accurate placement upon the valve seat upon the closing of the valve. The weight 46 pull the bell cranks down. A solenoid 49 with its bar 50 attached by link 51 to arm 52 rigidly mounted on rod 44, upon activation pulls the bell cranks 42 and 43 up. See Figures 3, 5 and 8.

When the bell cranks are down the reactivation air inlet and outlet are closed and when the solenoid pulls the bell cranks up, the air drying inlet and outlet are closed.

Figure 6:
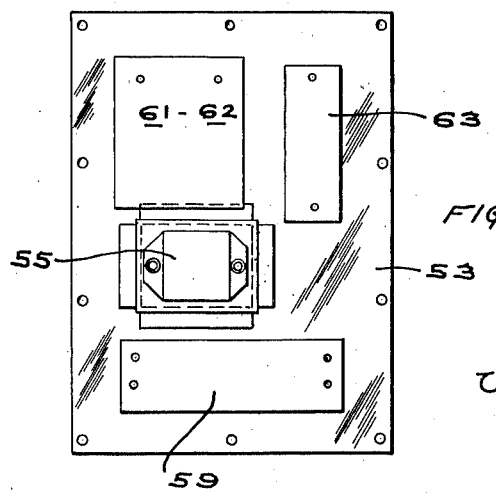
Figure 6 is a rear elevation of the electrical equipment panel removed.
Figure 9:
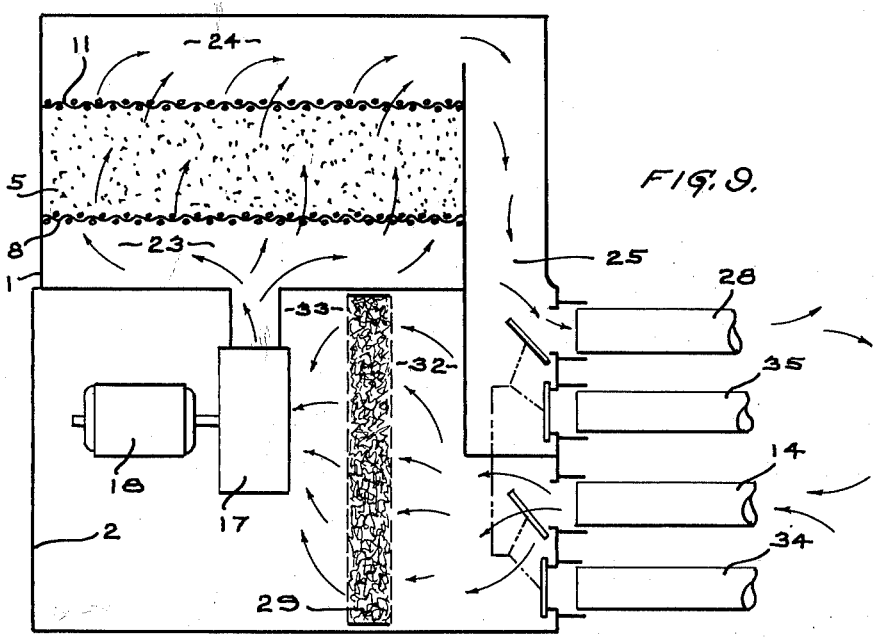
Figure 9 is a flow diagram illustrating the drying cycle.
Figure 10:
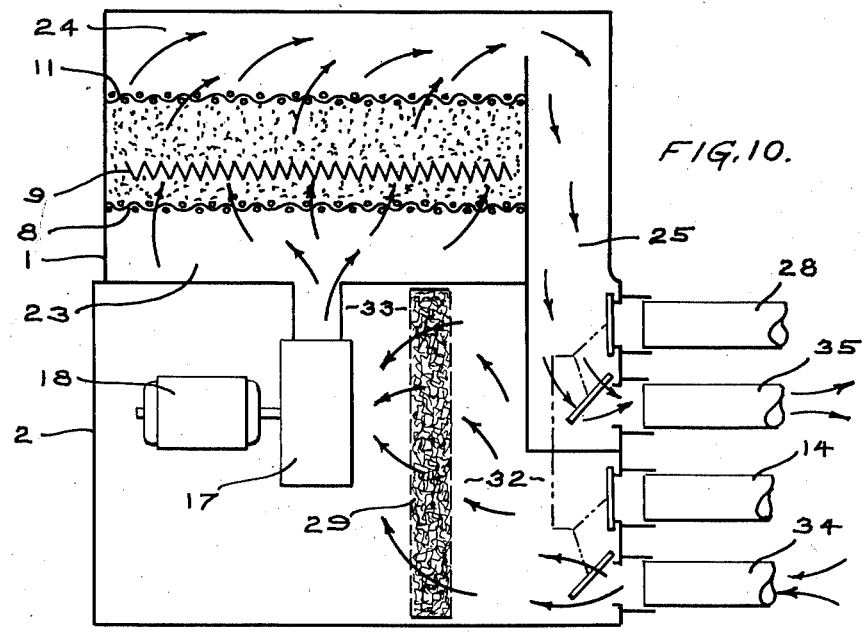
Figure 10 is a flow diagram illustrating the reactivation cycle.
Figure 13:
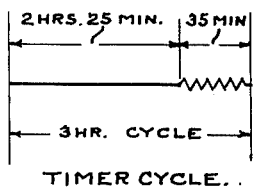
Figure 13 shows the timer cycle.
Figure 12:
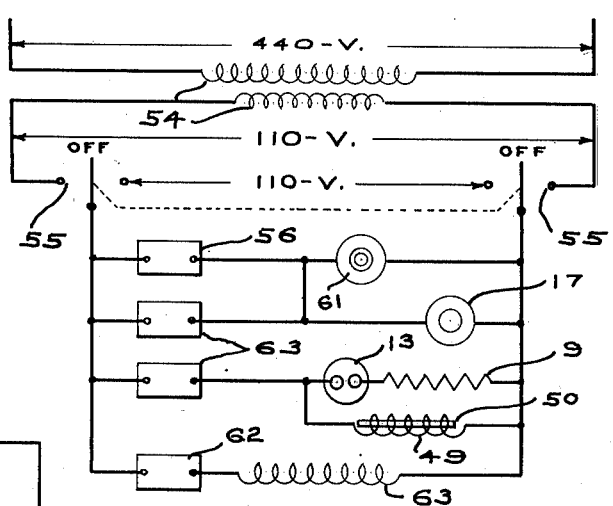
Figure 12 shows the control circuit.
Figure 11:
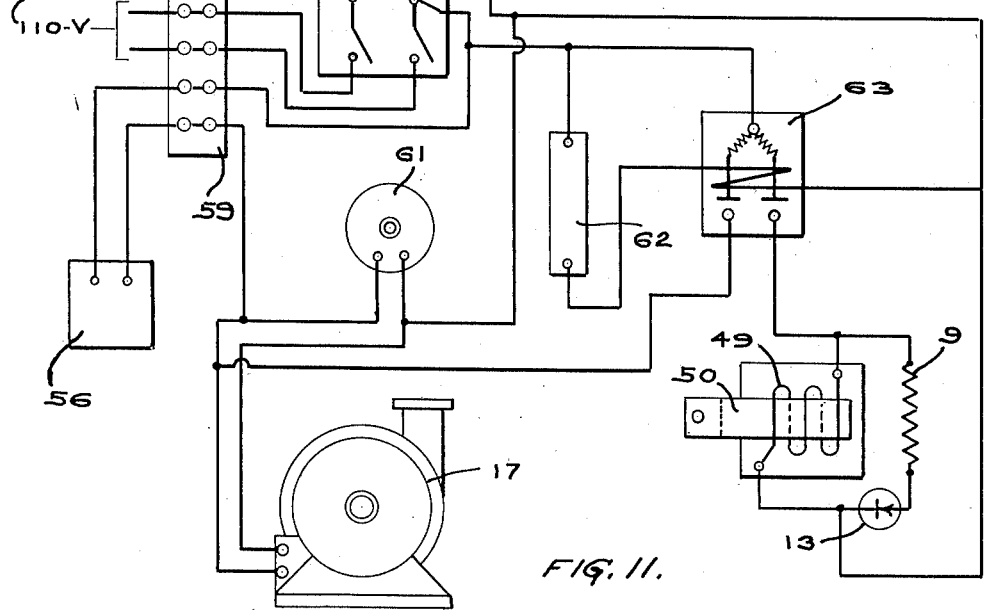
Figure 11 shows the wiring diagram.

The electrical connections are all attached to a panel 53 which may be removed for their adjustment and inspection. The illustrated package dehumidifier is equipped with a transformer 54 so that the dehumidifier may be used whether a current of 440 volts or 110 volts is available. The electrical equipment embodied in the dehumidifier is standardized for use of 110 volts and the transformer may be used where 440 volts is available to bring that voltage down for use with 110 volt equipment. As shown in the wiring diagram and in the control circuit both rather diagrammatically, the electric system involves a switch 55 which may be thrown in either position depending upon whether current of 440 volts or current of 110 volts is available. A humidistat 56 is connected with the dehumidifier with its lead connection with the container being shown at 57 and the power connection of either 440 or 110 volts is shown at 58. The ground for the terminal strip 59 is shown at 60. The timer motor is shown at 61 and the timer switch at 62. A relay is shown at 63. See Figures 6, 11 and 12.

When the humidistat calls for a reduction of the humidity in the space where the dehumidifier is placed and when the proper electrical connections are effected, the fan and timer are both started into operation. If at that moment the timer switch is open, the heater is off and the solenoid is not active, the air inlets and outlets are consequently open and moist air is drawn in through the inlet and dry air after passing through the air filter and desiccant bed is passed out of the container through the dry air outlet.

When the desiccant bed has adsorbed a reasonable amount of moisture the timer switch is closed by the timer, the relay is closed, the solenoid is actuated, the heater is turned on, the air inlet and outlet are closed, the reactivation air inlet and outlet are opened and the reactivation cycle begins. It will be noted from the wiring diagram that through the relay the fan has another connection to assure its operation during the period that the heater is on.

The timer cycle is designed so that through a period of three hours the drying cycle occupies a time of two hours and twenty-five minutes and the reactivation cycle a time of thirty-five minutes. Of course the relative times of these cycles may be changed to suit the requirements of the space being dehumidified and the quality of the desiccant to adsorb moisture from the air passed through it.

The operation of the package dehumidifier will be apparent from the above detailed description and it will likewise be apparent that many modifications of details in the construction may be made without departing from the invention.

What is claimed as new and is desired to be secured by Letters Patent is:

1. A dehumidifier comprising a closed container divided into two communicating chambers, a removable panel constituting a portion of the container wall of one of said chambers, the panel having therein an air drying inlet and outlet and a reactivation air inlet and outlet, a fan and a desiccant bed within the container, each in one of said chambers, a reactivation heater adjacent the desiccant bed, flow directing means within the container including a partition directing air moved by the fan between said inlets and outlets and through said bed, in the same direction in drying and reactivation cycles, both said inlets being on one side of the partition and the outlets on the other, the partition extending to the panel, said flow directing means by-passing one of said chambers in directing air between the inlets and outlets, means to operate the fan and heater, valves controlling said inlets and outlets, means interconnecting all valves to open the reactivation inlet and outlet and close the drying inlet and outlet valves and vice-versa respectively automatically with starting and stopping of the operation of the heater.

2. A dehumidifier comprising a closed container divided into two communicating chambers, a removable panel constituting a portion of the container wall of one of said chambers, the panel having therein an air drying inlet and outlet and a reactivation air inlet and outlet, a fan and a desiccant bed within the container, each in one of said chambers, a reactivation heater adjacent the desiccant bed, flow directing means within the container including a partition directing air moved by the fan between said inlets and outlets and through said bed, in the same direction in drying and reactivation cycles, both said inlets being on one side of the partition and the outlets on the other, the partition extending to the panel, said flow directing means by-passing one of said chambers in directing air between the inlets and outlets, means to operate the fan and heater, valves controlling said inlets and outlets, means interconnecting all said valves to open the reactivation inlet and outlet and close the drying inlet and outlet valves and vice-versa respectively automatically with starting and stopping of the operation of the heater, timing means to determine said cycles and means to determine the operation of the heater responsive to said timing means.

3. A dehumidifier responsive in operation to a humidostat and comprising a closed container divided into two communicating chambers, a removable panel constituting a portion of the container wall of one of said chambers, the panel having therein an air drying inlet and outlet and a reactivation air inlet and outlet, a fan and a desiccant bed within the container, each in one of said chambers, a reactivation heater adjacent the desiccant bed, flow directing means within the container including a partition directing air moved by the fan between said inlets and outlets and through said bed, in the same direction in drying and reactivation cycles, both said inlets being on one side of the partition and the outlets on the other, the partition extending to the panel, said flow directing means by-passing one of said chambers in directing air between the inlets and outlets, means to operate the fan and heater, valves controlling said inlets and outlets, means interconnecting all said valves to open the reactivation inlet and outlet and close the drying inlet and outlet valves and vice-versa respectively automatically with starting and stopping of the operation of the heater, timing means to determine said cycles and means to determine the operation of the heater responsive to said timing means, the fan and timing means operating responsively to the humidostat.

4. A dehumidifier comprising a closed container, a removable panel constituting a portion of the container wall, the panel having therein an air drying inlet and outlet and a reactivation air inlet and outlet, a partition within the container dividing it into two separate compartments, the panel constituting an outer wall of one compartment a fan and a desiccant bed each in one of said compartments, flow directing means within the container including a partition dividing both the inlets from the outlets, the said partition extending to the panel, through said flow directing means the inlets communicating with the fan, which draws air therethrough and discharges it to the desiccant bed compartment from which it is discharged through one of the outlets, said flow directing means by-passing one compartment in directing air between the inlets and the outlets a heater in the desiccant bed compartment, means to operate the heater and fan and an overlimit thermostatic means adjacent the desiccant bed to stop the heater operation and to restore it to operation after the cooling of the bed.

5. A dehumidifier comprising a closed container, a removable panel constituting a portion of the container wall, the panel having therein an air drying inlet and outlet and a reactivation air inlet and outlet, a partition within the container dividing it into two separate compartments, the panel constituting an outer wall of one compartment a fan and a desiccant bed each in one of said compartments, flow directing means within the container including a partition dividing both the inlets from the outlets, the said partition extending to the panel, through said flow directing means the inlets communicating with the fan, which draws air therethrough and discharges it to the desiccant bed compartment from which it is discharged through one of the outlets, said flow directing means by-passing one compartment in directing air between the inlets and the outlets a heater in the desiccant bed compartment, means to operate the heater and fan, a filter in the fan compartment, the air being drawn therethrough from the inlets, the fan compartment and desiccant bed compartment having on both sides of the filter and bed respectively space for the expansion of air before and after passing therethrough.

6. A dehumidifier comprising a closed container, a removable panel constituting a portion of the container wall, the panel having therein an air drying inlet and outlet and a reactivation air inlet and outlet, a partition within the container dividing it into two separate compartments, the panel constituting an outer wall of one compartment a fan and a desiccant bed each in one of said compartments, flow directing means within the container including a partition dividing both the inlets from the outlets, the said partition extending to the panel, through said flow directing means the inlets communicating with the fan, which draws air therethrough and discharges it to the desiccant bed compartment from which it is discharged through one of the outlets, said flow directing means by-passing one compartment in directing air between the inlets and the outlets a heater in the desiccant bed compartment, means to operate the heater and fan, interconnected valves on said panel opening and closing the inlets and outlets, and means to operate the valves in unison, to close the reactivation air inlet and outlet and open the drying inlet and outlet and vice-versa.

7. A dehumidifier comprising a closed container, a plurality of removable panels constituting portions of the container wall, one panel having therein an air drying inlet and outlet and a reactivation air inlet and outlet, partitions within the container dividing it into separate compartments, each of the panel constituting an outer wall of one compartment, a fan and a desiccant bed each in one of said compartments, flow directing means within the container including a partition dividing both the inlets from the outlets, the said partition extending to the inlet and outlet panel, through said flow directing means the inlets communicating with the fan, which draws air therethrough and discharges it to the desiccant bed compartment from which it is discharged through one of the outlets, said flow directing means by-passing one compartment in directing air between the inlets and the outlets a heater in the desiccant bed compartment, means to operate the heater and fan, interconnected valves on said panel opening and closing the inlets and outlets, and means to operate the valves in unison, to close the reactivation air inlet and outlet and open the drying inlet and outlet and vice-versa, timing means on another of said panels, the fan, heater and valve operating means being electrical and their terminals being connected to said last named panel and said timing means.

8. A dehumidifier comprising a closed container, a plurality of removable panels constituting portions of the container wall, one panel having therein an air drying inlet and outlet and a reactivation air inlet and outlet, partitions within the container dividing it into separate compartments, each of the panels constituting an outer wall of one compartment, a fan and a desiccant bed each in one of said compartments, flow directing means within the container including a partition dividing both the inlets from the outlets, the said partition extending to the inlet and outlet panel, through said flow directing means the inlets communicating with the fan, which draws air therethrough and discharges it to the desiccant bed compartment from which it is discharged through one of the outlets, a heater in the desiccant bed compartment, means to operate the heater and fan, interconnected valves on said panel opening and closing the inlets and outlets, and means to operate the valves in unison, to close the reactivation air inlet and outlet and open the drying inlet and outlet and vice-versa, the fan, heater and valve operating means being electrical and being connected to another of said panels, a single current inlet to said container, mounted on said last named panel, and being thereon connected to the fan, heater and valve operating means.

WILLIAM WALLACE KEMP.
HARTWIG MILLARD HANSON.

REFERENCES CITED

The following references are of record in the file of this patent:

UNITED STATES PATENTS

| Number    | Name     | Date          |
|-----------|----------|---------------|
| 1,667,316 | Hartman  | Apr. 24, 1928 |
| 1,692,064 | Trogner  | Nov. 20, 1928 |
| 1,863,656 | Hartman  | June 21, 1932 |
| 1,986,814 | Hartman  | Jan. 8, 1935  |
| 2,052,931 | Lednum   | Sept. 1, 1936 |
| 2,075,036 | Hollis   | Mar. 30, 1937 |
| 2,124,268 | Williams | July 19, 1938 |
| 2,160,831 | Colby    | June 6, 1939  |
| 2,201,688 | Zuhlke   | May 21, 1940  |
| 2,248,225 | Fonda    | July 8, 1941  |
| 2,328,521 | Wittmann | Aug. 31, 1943 |
| 2,434,297 | Test     | Jan. 13, 1948 |